United States Patent [19]

Skierski

[11] 4,355,430

[45] Oct. 26, 1982

[54] POINTING MACHINE

[75] Inventor: Edwin J. Skierski, Campbellsville, Ky.

[73] Assignee: USM Corporation, Farmington, Conn.

[21] Appl. No.: 260,304

[22] Filed: May 4, 1981

Related U.S. Application Data

[63] Continuation of Ser. No. 75,744, Sep. 14, 1979, abandoned.

[51] Int. Cl.³ ............................................. B23G 9/00
[52] U.S. Cl. ........................................... 10/9; 10/21; 10/169
[58] Field of Search ................ 10/2, 4, 9, 10 R, 20.5, 10/21, 169

[56] References Cited

U.S. PATENT DOCUMENTS

| | | | |
|---|---|---|---|
| 3,786,527 | 1/1974 | Morton et al. | 10/9 X |
| 4,149,287 | 4/1979 | Skierski | 10/9 |
| 4,184,217 | 1/1980 | Dohi | 10/9 |

Primary Examiner—Mark Rosenbaum
Attorney, Agent, or Firm—Donald N. Halgren

[57] ABSTRACT

A machine for producing points on the pilot end of a rotary fastener, the machine comprising a rotating dial for supporting an array of blank fasteners above a pair of dies. The blank fasteners are sequentially fed between the dies for pointing thereof. The dial is notched on its periphery to hold the blanks therein. The fasteners are held in coaxial alignment with the pinch point of the dies, by a notched biased centering plate, permitting accurate pointing of the fastener along the axis thereof.

11 Claims, 6 Drawing Figures

U.S. Patent   Oct. 26, 1982   Sheet 1 of 2   4,355,430
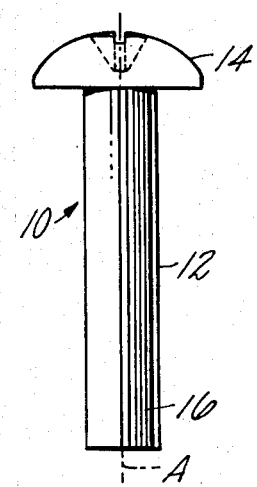
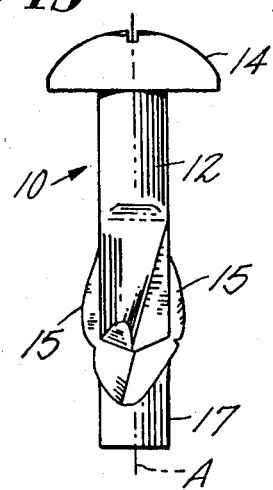
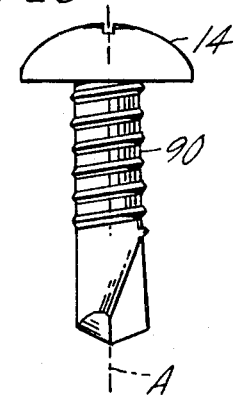
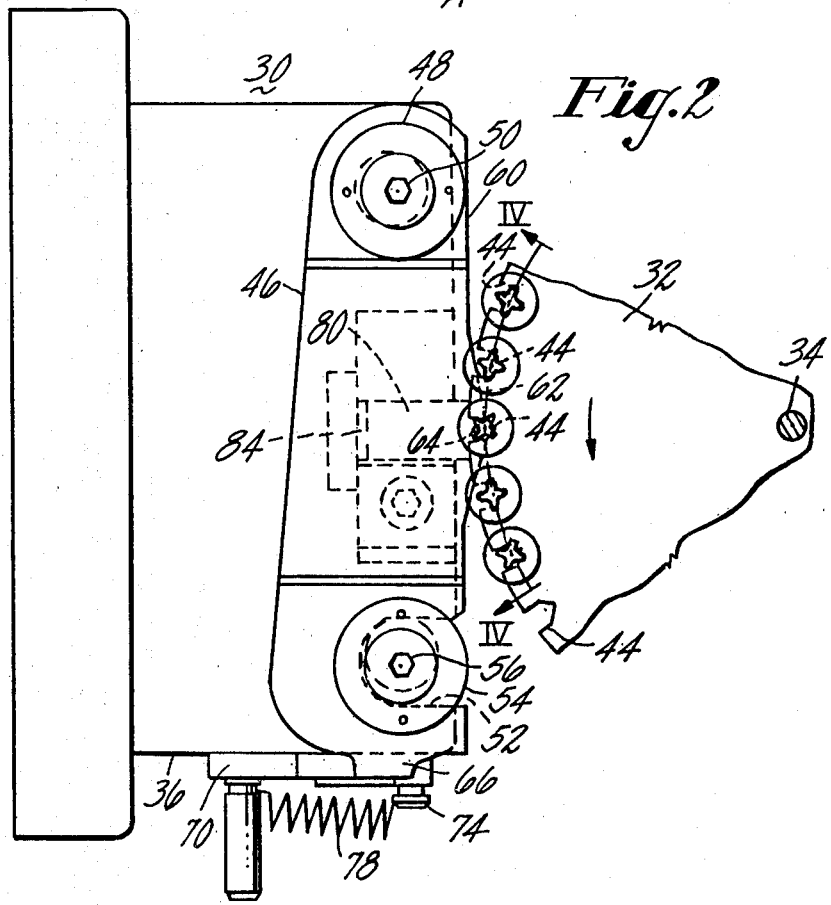

POINTING MACHINE

This is a continuation, of application Ser. No. 075,744, filed Sept. 14, 1979, now abandoned.

BACKGROUND OF THE INVENTION

(1) Field of the Invention

The present invention relates to machines for pinch pointing the pilot ends of metal screw blanks, and more particularly to an arrangement for holding the screw blanks in the machine as the blanks are pointed.

(2) Prior Art

It was the practice, in the prior art screw manufacture, to machine the cutting edges in the pilot end of a screw blank. It was a costly operation. Advances in the screw manufacture art introduced the use of dies to pinch or punch the cutting edges in screw blanks prior to their being threaded. Dies of this type are embodied in U.S. Pat. Nos. 3,395,603 and 3,398,413, both of which are assigned to the assignee of the present invention. The dies described therein are used on machines which utilize a process, wherein 300 to 700 screw blanks per minute may typically be fed to a rotating dial having notches in its periphery. The dial rotates with the blanks supported generally vertically in the notches, to successively bring the blanks between a pair of dies. A presser foot is activated to move radially inwards to keep the blank in its notch on the periphery of the dial, during the pinching operation. U.S. Pat. No. 4,149,287, also assigned to the present assignee, defines an invention wherein the fastener shaft is prevented from being bent during the pinching operation by the utilization of an angularly arranged notch in the rotatable dial of the machine to counteract the normal squeezing an distortion of the fastener shaft. However, in all of the prior art machines, the pinch point may not always be aligned with the axis of the shaft, causing poor drilling qualities therewith. The amount of point misalignment may be as much as 8° off the axis of the shaft, depending on shaft length and diameter. Misalignment may also occur because it is almost impossible to consistently produce blank fasteners with straight shafts perpendicular to the underside of their heads in cold heading operation, which is the standard way blank fasteners are manufactured.

It is an object of the present invention to provide an improved pointing machine that will overcome the above-identified problems and pinch screw blanks without simultaneously causing a misalignment of the screw shaft with the pinch point.

SUMMARY OF THE INVENTION

The present invention comprises a pointing machine for producing points on screw blanks. The machine includes a rotatable dial having a plurality of generally axially aligned notches disposed on its periphery. The dial rotates to successively align screw blanks suspended in the notches, between a fixed and a movable die. The notches may be angled inwardly to the center of the dial, that is, they slope inwardly from the top side of the dial to the bottom side of the dial. A biased center plate arranged above the fixed die, pivots radially away from and toward the screw blank held in the dial. The biased center plate, having a pivot distance which is adjustable, itself has a notch arranged to secure the screw blank against the notch in the dial, to prevent misalignment during the pinching operation, insuring alignment of the pinch point and the center line of the screw blank shaft.

BRIEF DESCRIPTION OF THE DRAWINGS

The objects and advantages of the present invention will become more apparent when viewed in conjunction with the following drawings, in which:

FIGS. 1A, B and C are side views of a screw blank, a pinch pointed screw blank and a threaded screw, respectively, the first two showing the initial and final stages of operation on a screw blank of the present machine;

FIG. 2 is a plan view of a portion of a machine constructed according to the principles of the present invention;

DESCRIPTION OF THE PREFERRED EMBODIMENT

Figure 3:
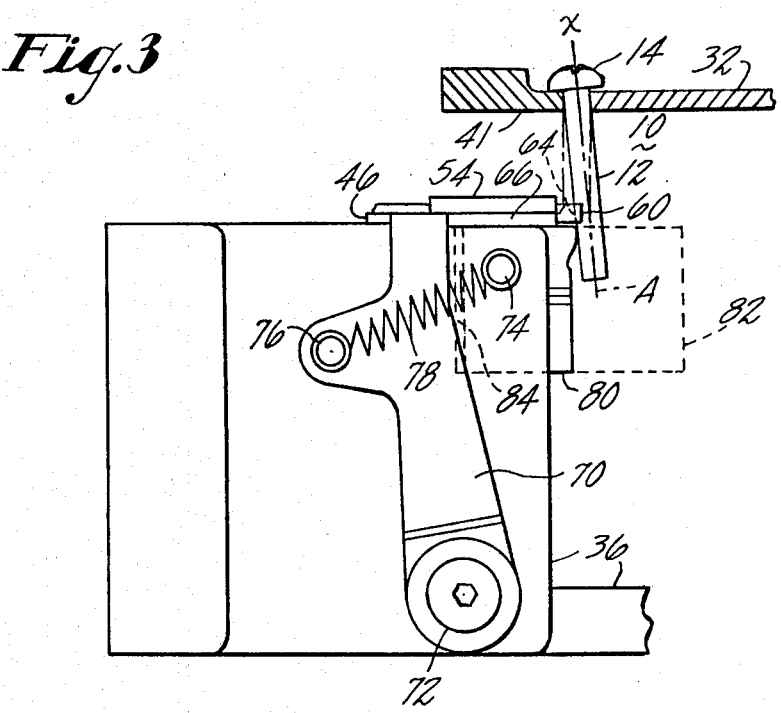
FIG. 3 is a partial side-elevational view of the machine.

Referring to the drawings in detail, and particularly to FIG. 1A, there is shown a screw blank 10 having an elongated shank or shaft 12 and a head 14. Each screw blank 10 also comprises a pilot end 16, which is opposite to the head 14. The head 14 may be provided with any convenient means for cooperating with a tool for turning the screw to effect insertion or withdrawal thereof. In FIG. 1B, the screw blank 10 is shown having a pair of ears 15 and a tail 17 which all remain integral with the screw blank 10 after the die pinching operation, which will ultimately be made into a finished product as shown in FIG. 1C.

The screw blanks 10 are processed in a pointing machine 30, generally of the type described in U.S. Pat. No. 4,149,287, which is hereby incorporated by reference, portions of which are similar to the present pointing machine invention, which is partially shown in FIG. 2. The pointing machine 30 comprises a generally horizontally arranged dial or disc 32, rotatably disposed on a shaft 34, which extends through the upper surface of the dial 32. The shaft 34 is attached to a frame portion 36 of the machine 30. The dial 32 is driven by an indexing mechanism, not shown, included on the machine 30. The machine 30 may also include a supply chute, not shown, and a lower retaining ring, also not shown, and an upper "C-shaped" retainer ring 41, disposed horizontally adjacent the dial 32, similar to that shown in the aforementioned patent.

The rotatable dial 32 has a plurality of generally axially disposed notches 44 arranged on its periphery. A longitudinally extending centering lever 46 is pivoted at its proximal end, about an eccentric shouldered washer 48. The eccentric washer 48 is secured to the frame 36 by a through-bolt 50. The centering lever 46 has a U-shaped cut-out 52 at its distal end. The cut-out 52 mates with a second eccentric shouldered washer 54 which is adjustably secured to the frame 36 of the machine 30, by a bolt 56. The centering lever 46 has an inwardly facing edge 60 of generally linear configuration. The edge 60 also comprises an outwardly projecting curve 62, directed toward the center of the dial 32. At the midpoint of the edge 60, there is a notch 64, arranged to generally oppose, one at a time, the notches 44 in the dial 32. A tab 66, extends off of the distal end of the centering lever 46. A biased lever 70, shown in FIG. 3, pivots about a shouldered washer 72, which is screwed to the bottom of the frame 36. The distal end of the biased lever 70 is in abutting engagement with the tab 66 on the centering lever 46. A stationary anchor pin 74 is attached to and extends off of the frame 36 on the side of the pointing machine 30, just beneath the tab 66. A second pin 76 is attached to and stands off from the biased lever 70. A biasing means such as a tension spring 78 is secured between the anchor pin 74 and the second pin 76.

A fixed die 80 and a reciprocating die 82 are arranged beneath the rotating dial 32, as described in the aforementioned U.S. Pat. No. 4,149,287. The fixed die 80 is secured to the frame 36. A spacer 84 is insertably arranged between the fixed die 80 and the frame 36, and is firmly locked in place. The thickness of the spacer 84 is one-half the diameter of the shaft 12 of the particular side screw blank 10 being pinch pointed. The curvilinear spring loaded blank retainer ring 41, shown only in FIG. 3, holds the screw blanks 10 in their respective notches 44 against radial movement caused by centrifugal forces generaged therein as the dial 32 rotates about the shaft 34.

Figure 4:
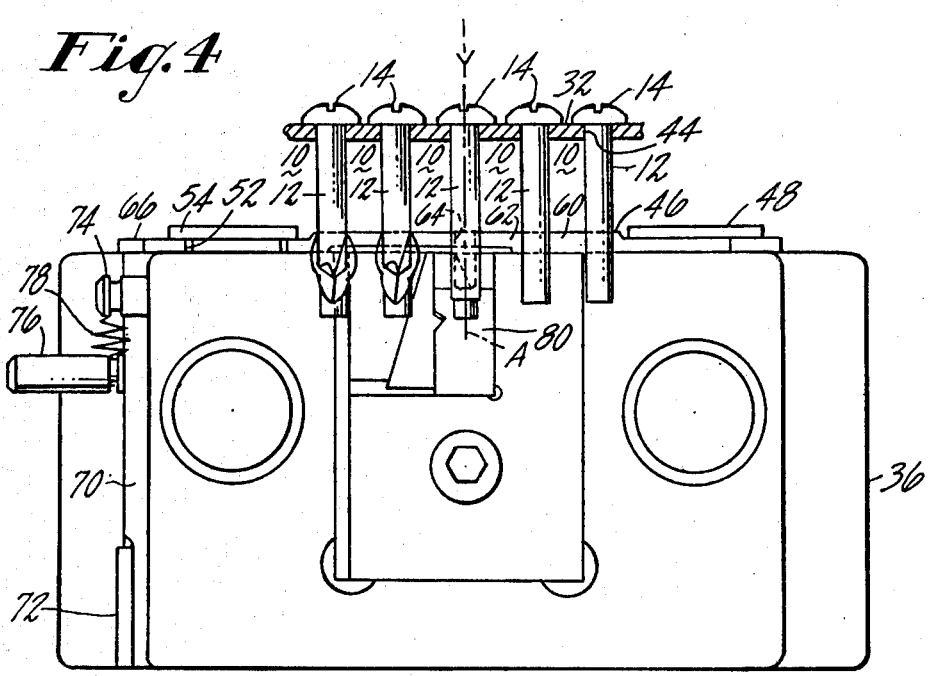
FIG. 4 is a view taken along the lines IV–IV of FIG. 2.

In operation of the pinch pointing maching 30, a plurality of screw blanks 10 are guided down the supply chute, not shown, and are each received in one of the notches 44 as they successively rotate therepast. The screw blanks 10 are held in their curvilinear path as the disc 32 intermittantly rotates by the retainer rings, as partially shown in FIG. 3. As each blank 10 in the dial 32 approaches the point of rotation between the dies 80 and 82, the shank 12 rubs against the outwardly projecting curve 62 on the outward centering lever 46. The centering lever 46, is caused thereby to pivot radially away from the center of the dial 32. As the blank 10 is caused to rotate to the proper location between the fixed and movable dies, 80 and 82, and is secured therebetween by the notch 64 in the centering lever 46 pressing the shaft 12 tightly against the notch 44 in the dial 32, the centering lever 46, biased by the spring 78, has been momentarily caused to pivot quickly towards the center of the dial 32, momentarily orienting the screw blank 10 properly between the dies 80 and 82, permitting the axis "A" of the blank 10 shown in FIGS. 3 and 4, to coincide both tangential and radial with the pinch point defined by the fixed and movable dies 80 and 82 on the blank shank 12 therebetween. The centering plate 46, still biased towards the center of the dial 32, gives a slight push on the newly pinch pointed shank 12 towards the center of the dial 32, causing the blank 12 to be pushed off of the configuration of the fixed die 80. The movable die 82 is concurrently withdrawn and the intermittent rotation of the dial 32 causes a new screw blank 10 to be pushed against the outwardly projecting curve on the centering plate 60, pusing it radially away from the dial 32, until the blank 12 is rotated to and suddenly secured between the opposing notches, 44 and 64. The constant bias on the centering plate 46 is provided by the interaction of the distal end of the biased lever 70 in abutting engagement with the distal end of the centering plate 46.

As the dial 32 rotates, the pinch pointed screw blanks 10 are caused to be ejected therefrom, similar to the manner described in the aforementioned patent, and collected in a bin, not shown, ready for further processing which finally produces a finished screw 90, as shown in FIG. 1c.

The eccentric shouldered washer 48 permits both tangential and radial adjustment in the location of the notch 62 to govern the tilt of the axis of the screw blank 10 in relation to the dies, 80 and 82, which might be necessary with screw blanks 10 having different shank diameters. The eccentric washer 54 arranged in the cutout 52 in the distal end of the centering plate 46 similarly facilitates both tangential and radial adjustment of the notch 64.

Thus there has been shown a pinch pointing machine having a mechanism which can properly secure screw blanks between a pair of dies, to permit the tangential and radial alignment of the axis of the screw blank with the proper pinch-pointing center of the dies, and which mechanism may be easily adjustable to accommodate differing diameters of screw blanks, thus obviating the need for a plurality of dials of different thicknesses and centering levers with different notch configurations, which would otherwise be necessary to hold the screw blanks at the proper preselected angle and alignment during the pinch-pointing operation.

It is intended that the appended claims are to be interpreted as exemplary only and not in a limiting sense.

I claim:

1. A pinch pointing machine for pinch pointing a point on screw blanks, said machine comprising:
   a pair of dies for pinch pointing, by a pinching operation, screw blanks therebetween;
   means for supporting successive screw blanks between said pair of dies; and
   alignment means for accurately securing both tangentially and radially each successive screw blank between said dies during the pinching of each of said blanks to permit their longitudinal axis to be properly aligned with said dies, whereupon said axis and the point on said screw blank are coaxial, said alignment means including a pivotable member with a screw blank locating portion thereon to help control the tangential and radial orientation of said screw blank between said dies.

2. A pinch pointing machine as recited in claim 1, wherein said pair of dies comprises a fixed die and a movable die.

3. A pinch pointing machine as recited in claim 1, wherein said means for supporting screw blanks between a pair of dies comprises a notched rotary dial, and a curvilinear side guide.

4. A pinch pointing machine as recited in claim 3, wherein said pivotable member has an edge which is in sliding engagement with said screw blanks held in said dial.

5. A pinch pointing machine as recited in claim 4, wherein said edge on said pivotable member extends toward said dial to cause said pivotable member to pivot away from said dial, during a portion of the interaction between said screw blanks and said pivotable member.

6. A pinch pointing machine as recited in claim 4, wherein a biasing means acts upon the distal end of said pivotable member to bias said pivotable member towards said dial.

7. A pinch pointing machine as recited in claim 4, wherein said pivotable member is adjustably secured to a frame portion of said machine by an eccentric washer.

8. A pinch pointing machine as recited in claim 4, wherein said pivotable member causes the axis each of said screw blanks to be angularly aligned with respect to said dies prior to the pinching operation being performed between said dies.

9. A pinch pointing machine as recited in claims 7 or 8, wherein said pivotable member can be adjusted to maintain the axes of a variety of different diameter shafts of different screw blanks in alignment with the point formed by the pinch pointing dies.

10. A pinch pointing machine as recited in claim 7, wherein said fixed die has a changeable spacer element between said frame portion and said fixed die.

11. A pinch pointing machine as recited in claim 10, wherein the thickness of said spacer element is one-half the diameter of the shank of the particular screw blank being pinch pointed.

* * * * *